US011673834B2

(12) United States Patent
Toussaint

(10) Patent No.: US 11,673,834 B2
(45) Date of Patent: Jun. 13, 2023

(54) CLOSED CELL GEOPOLYMER FOAM

(71) Applicant: ISOLFEU-CREATION, Metz (FR)

(72) Inventor: Philippe Toussaint, Queven (FR)

(73) Assignee: ISOLFEU-CREATION, Metz (FR)

( * ) Notice: Subject to any disclaimer, the term of this patent is extended or adjusted under 35 U.S.C. 154(b) by 69 days.

(21) Appl. No.: 17/269,122

(22) PCT Filed: Dec. 7, 2020

(86) PCT No.: PCT/EP2020/084954
§ 371 (c)(1),
(2) Date: Feb. 17, 2021

(87) PCT Pub. No.: WO2021/111011
PCT Pub. Date: Jun. 10, 2021

(65) Prior Publication Data
US 2022/0119314 A1   Apr. 21, 2022

(30) Foreign Application Priority Data

Dec. 5, 2019   (FR) ...................................... 1913833

(51) Int. Cl.
| | |
|---|---|
| *C04B 28/26* | (2006.01) |
| *C04B 28/00* | (2006.01) |
| *C04B 18/24* | (2006.01) |
| *C04B 38/10* | (2006.01) |
| *C04B 22/06* | (2006.01) |
| *C04B 103/40* | (2006.01) |

(52) U.S. Cl.
CPC .............. *C04B 28/26* (2013.01); *C04B 18/24* (2013.01); *C04B 22/062* (2013.01); *C04B 28/006* (2013.01); *C04B 38/10* (2013.01); *C04B 2103/40* (2013.01)

(58) Field of Classification Search
CPC ....... C04B 12/04; C04B 14/106; C04B 18/24; C04B 18/26; C04B 18/241; C04B 20/006; C04B 22/006; C04B 22/062; C04B 22/064; C04B 24/10; C04B 24/42; C04B 28/006; C04B 28/26; C04B 38/0061; C04B 38/10; C04B 2103/12; C04B 2103/40; C04B 2103/65; C04B 2111/28; C04B 2111/40; Y02P 40/10; Y02W 30/91
See application file for complete search history.

(56) References Cited

U.S. PATENT DOCUMENTS

| | | | |
|---|---|---|---|
| 10,214,452 B2 * | 2/2019 | Turcinskas | ............ C04B 28/006 |
| 2014/0005302 A1 | 1/2014 | Briand et al. | |
| 2015/0060720 A1 | 3/2015 | Feige et al. | |
| 2019/0152853 A1 * | 5/2019 | Turcinskas | ............ C04B 28/006 |

FOREIGN PATENT DOCUMENTS

| | | |
|---|---|---|
| DE | 102004006563 A1 | 9/2005 |
| FR | 2659963 | 9/1991 |
| FR | 2680194 | 2/1993 |
| FR | 3027023 A1 | 4/2016 |
| WO | 2011/003918 A1 | 1/2011 |
| WO | 2015/062860 A1 | 3/2015 |
| WO | 2015062819 A1 | 5/2015 |
| WO | 2015/082513 A1 | 6/2015 |
| WO | 2015/082585 A1 | 6/2015 |
| WO | 2017/138913 A1 | 8/2017 |
| WO | 2017174560 A1 | 10/2017 |
| WO | 2018091482 A1 | 5/2018 |

OTHER PUBLICATIONS

Canadian Office Action issued in connection with related Canadian Patent Application n. 3,113,656 dated Feb. 11, 2022.
Prud' Homme et al., "Use of Silicon carbide sludge to form porous alkali-activated materials for insulating application," European Physical Journal, Special Topics, The Springer, DE, FR vol. 224, No. 9 pp. 1725-1735, dated Jul. 30, 2015.
Written Opinion and Search Report issued in connection with related French Patent Application No. FR1913833 dated Oct. 15, 2020.
PCT Written Opinion and Search Report issued in connection with related PCT/EP2020/084954 dated Feb. 21, 22, 2021 with English translation.
Canadian Office Action issued in connection with related Canadian Patent Application No. 3,113,656 dated Nov. 16, 2021.
French Office Action issued in connection with related French Patent Application No. 1913833 dated Jul. 1, 2022 with English translation.

* cited by examiner

*Primary Examiner* — Anthony J Green
(74) *Attorney, Agent, or Firm* — Dentons US LLP

(57) ABSTRACT

TA geopolymer foam having: from 50% to 90% by mass of pozzolanic material polymerized relative to a total mass of the foam; from 0.01% to 2%, by mass of the at least one surfactant relative to the total mass of said foam; and from 1% to 20% by mass of fibers with lengths of between 5 and 1500 μm relative to the total mass of said foam. A process and a composition for manufacturing the foam, as well applications of the foam, are also disclosed.
Finally, the invention relates to a kit comprising said composition for the manufacture of said foam, as well as a pozzolanic material.

8 Claims, 1 Drawing Sheet

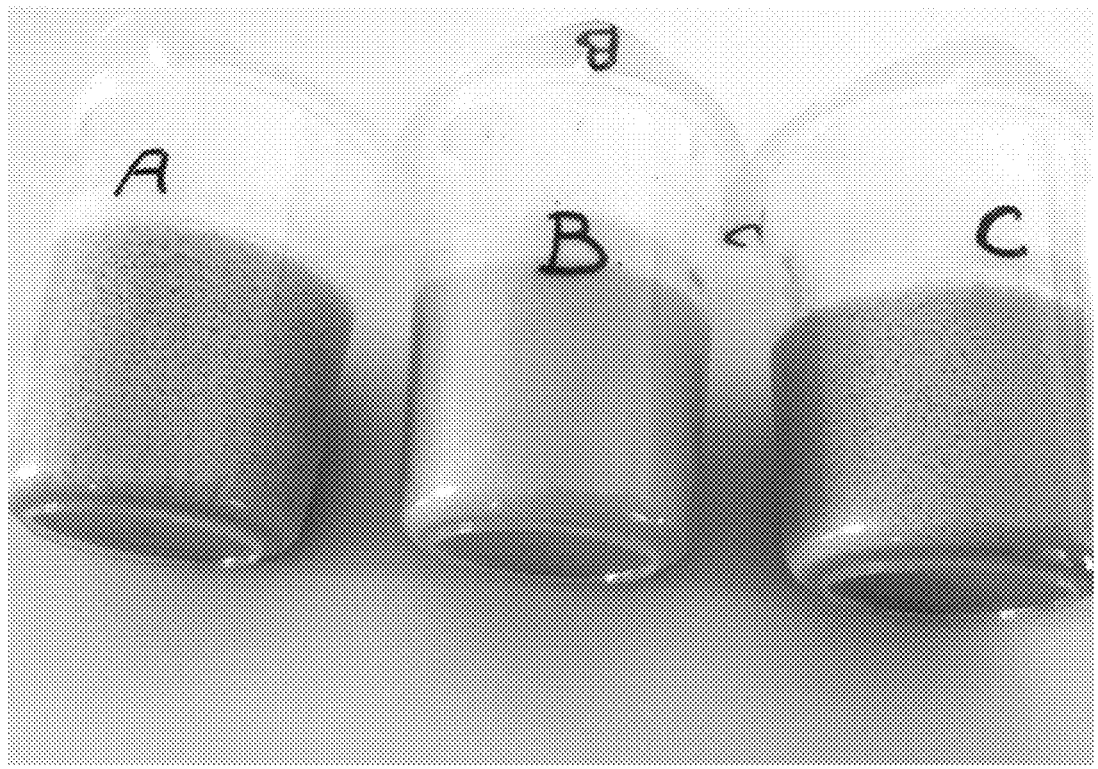

CLOSED CELL GEOPOLYMER FOAM

CROSS-REFERENCE TO RELATED PATENT APPLICATIONS

This patent application is the 35 U.S.C. 371 national stage of International Patent Application PCT/EP2020/084954 filed 7 Dec. 2020; which claims the benefit of priority to FR 19/13833 filed 5 Dec. 2019, which is incorporated by reference herein for all purposes.

The invention belongs to the field of geopolymers and more particularly to that of mineral foams.

The invention relates to an incombustible and thermally insulating mineral foam.

The invention also relates to the method for manufacturing said foam, as well as the intermediate composition designed to form the foam.

The invention also relates to insulated or sealed doors or pipes and other supports upon which is applied, or upon which is comprised, said foam.

Finally, the invention relates to a kit comprising said intermediate composition as well as a pozzolanic material.

PRIOR ART

Geopolymer foams are known from the prior art. Geopolymer foams have many advantages, the main one being that instead of the carbon chain of conventional polymers, mineral material composed of silica and alumina is used. They are therefore inorganic polymers composed of mineral matter such as silica and alumina.

In the context of this invention, by geopolymer is meant an inorganic polymer essentially composed of units, silico-oxide (—Si—O—Si—O—), silico-aluminate (—Si—O—Al—O—), ferro-silico-aluminate (—Fe—O—Si—O—Al—O—) or aluminum-phosphate (—Al—O—P—O—), created by a process called geopolymerization.

Geopolymers, by their nature, find applications in the field of construction, in particular for the manufacture of cements and concrete or even fire protection. These mineral foams are of particular interest due to their low density and their insulating and fire-resistant properties which make them suitable for use in the construction of walls, doors, insulation panels and may also be used to insulate, seal or repair pipes, furnaces and other systems subjected to high temperatures. These latter uses imply that the foam forms and hardens quickly (in a few minutes to a few tens of minutes) so that it may be applied directly to the area to be isolated or sealed.

The incombustible mineral foams of the invention can in particular be prepared from an inorganic binder such as metakaolin, a natural pozzolanic material. The term "metakaolin" is understood to mean a thermally dehydroxylated kaolinite clay. In other words, it is a dehydroxylated alumina silicate of general composition $Al_2O_3, 2SiO_2$.

It is known that one can prepare a geopolymer in the form of a mineral foam by mixing an inorganic binder with a so-called activation solution, most often comprising alkali metal hydroxides, then adding thereto an expanding agent which will form a gas in situ. The generation of gas will create gas bubbles in the liquid phase and form a foam, while the reaction of the inorganic binder with the activating solution most often accelerated by the addition of a hardener (for example a $Ca^{2+}$ donor) causes rapid hardening, the result of polymerization, which then freezes the network of bubbles or the porosity. The product obtained is a rigid and porous foam.

Geopolymer foams can also be made with an external gas supply unlike foams made by in situ gas generation. Generally speaking, foams with an external gas supply are made in two stages. On the one hand, an aqueous foam is made from water and surfactants, on the other hand, a slurry of the inorganic binder is made. A foam is thus obtained resulting from the mixture of the slurry with the aqueous foam, which will gradually solidify over a relatively long period depending on the inorganic binder used. It is also possible to manufacture a geopolymer foam in a single step by mixing an inorganic binder with an activating solution to which foaming agents are added. Using different tools, a gas (for example air), is then introduced to the suspension obtained. The manufacture of foam using an external gas supply requires obtaining a very stable foam not only over time but also vis-à-vis the phenomena of coalescence or disappearance of bubbles or microbubbles of gas after injection and dispersion of the latter.

FR3027023 discloses foams prepared from metakaolin, one or more natural or synthetic foaming agents of animal or plant origin. In particular, this application targets foaming agents of the protein type.

WO2015062860 discloses foams based on metakaolin and further comprising a surfactant. The authors recommend the use of nonionic surfactants, such as alkyl polyglucosides for stabilization of the foam. A supply of gas is preferred over gas generation in situ. Fibers acting as fillers may be used in order to improve the mechanical stability of the hardened foam, these fibers preferably having a millimetric length of a maximum of 120 mm, particularly a maximum of 6 mm.

DE102004006563 discloses organic/inorganic hybrid foams comprising surfactants. In particular, the surfactants are amine oxides and alkyl sulfates.

US2015060720 or WO2015062819 disclose methods of preparing a fast curing (less than 10 minutes) inorganic foam. The blowing agent has the distinction of being scrap aluminum powder, which is a mixture of aluminum powder, aluminum nitride and aluminum oxide.

WO2018091482 discloses a metakaolin-based foam comprising the combination of 2 types of anionic and nonionic surfactants. The foam is formed by generating gas in situ. Fibers acting as fillers may be used, their lengths being less than 5 mm.

WO2017138913 discloses a composition of cement foam comprising a hydraulic cement, water, a foam-generating surfactant, a gas and stabilizing cellulose nanofibers (CNF) of a size between 35 and 10,000 μm. The CNFs are obtained by high-energy complex grinding methods and/or chemical or enzymatic pretreatments, as opposed to cellulose fibers of micrometric sizes obtained generally through wet grinding and selection that possess a simple morphology without crystallinity or ramification.

The Prud'homme et al. Eur. Phys. J. Special Topics 224, 1725-1735 (2015) publication discusses the control of the porosity and thermal properties of geopolymer material either by modification of the formula or by adding additives, the second option being considered as the most promising. The influence of the additives on the mass of the samples is debated, FIG. 7 shows that the increase of the mass of the foam increases the thermal conductivity up until a certain point, and that the use of additives such as carbo fibers, cellulose fibers or starch increases the mass of the foam and also increases the thermal conductivity.

WO2017174560M discloses a geopolymer foam comprising cellulose nanofibers used for sound-absorbing applications. The disclosed foam possesses a majority of open cells due to the precise quantity of cellulose nanofibers.

The disadvantage of the mineral foams of the prior art is their open-cell nature resulting in high thermal conductivity. Open cells or pores are cells that are interconnected or have open binding channels. These open channels more or less connect the cells. The thermal conductivity of a foam is dependent on the porosity of the system and is therefore determined by the path of the air through the composition. The air path through an open cell foam is facilitated resulting in an increase in thermal conductivity.

The Applicant has surprisingly demonstrated that the use of micrometric lengths of fibers combined with the use of a specific amount of surfactants, gives mineral foam a perfectly stable closed-cell nature, and consequently a relatively low thermal conductivity.

None of the abovementioned documents address the relationship between the size of the fibers and the foam cellularity, nor the means of obtaining the closed-cell mineral foams having a low thermal conductivity.

The properties of the foams according to the invention are as follows:
- incombustible foams;
- better control of foam mass;
- better control of cell density and size;
- better surface appearance (skin);
- reduced risk of cracks.

The incombustible mineral foams according to the invention may be used as fire barriers and comply with A1 according to the "reaction to fire" and "resistance to fire" standards, NF EN ISO 1182 and 1716 respectively. They have a thermal resistance up to at least 1200° C.

DESCRIPTION OF THE FIGURES

FIG. 1: Surface appearance of 3 samples of geopolymer foams respectively comprising from A to C no fibers, micrometric lengths of fibers, and millimetric lengths of fibers used as fillers.

DETAILED DESCRIPTION OF THE INVENTION

The invention consists of a geopolymer foam comprising:
- from 50% to 90% by mass of pozzolanic material polymerized relative to the total mass of said foam;
- from 0.01% to 2%, by mass of at least one surfactant relative to the total mass of said foam;
- from 1% to 20% by mass of fibers with lengths of between 5 and 1500 μm relative to the total mass of said foam.

The term "fibers" is understood to mean an element of elongated or extended shape. In the present application, the length of a fiber is considered to be of an average length.

"Polymerized pozzolanic material" is understood to be a geopolymer formed by the reaction of a pozzolanic material with an activating solution (e.g., a basic solution).

In one embodiment, the geopolymer foam according to the invention is characterized in that the pozzolanic material is metakaolin.

In one embodiment, the geopolymer foam according to the invention is characterized in that it comprises from 55% to 85% by mass of polymerized pozzolanic material relative to the total mass of said foam.

In one embodiment, the geopolymer foam according to the invention is characterized in that it comprises from 60% to 80% by mass of polymerized pozzolanic material relative to the total mass of said foam.

In one embodiment, the geopolymer foam according to the invention is characterized in that it comprises from 65% to 75% by mass of polymerized pozzolanic material relative to the total mass of said foam.

In one embodiment, the geopolymer foam according to the invention is characterized in that it comprises from 0.01% to 1.5% by mass of at least one surfactant relative to the total mass of said foam.

In one embodiment, the geopolymer foam according to the invention is characterized in that it comprises from 0.01% to 1% by mass of at least one surfactant relative to the total mass of said foam.

Preferably, the geopolymer foam according to the invention is characterized in that it comprises from 0.01 to 0.5% by mass of at least one surfactant relative to the total mass of said foam.

In one embodiment, the geopolymer foam according to the invention is characterized in that the at least one surfactant is selected from the group consisting of anionic surfactants, nonionic surfactants, and mixtures thereof.

The term "anionic surfactant" is intended to mean a surfactant which releases a negative charge in aqueous solution. The class of anionic surfactants is widely described in the literature.

In one embodiment, the geopolymer foam according to the invention is characterized in that the at least one surfactant is selected from the group consisting of anionic surfactants, nonionic surfactants, and mixtures thereof.

The term "nonionic surfactant" is understood to mean a surfactant whose molecules have no net charge. The class of nonionic surfactants is widely described in the literature.

In one embodiment, the geopolymer foam according to the invention is characterized in that the nonionic surfactants are selected from alkyl polyglucosides (D-glucopyranose, oligomers, alkyl glucosides).

In one embodiment, the geopolymer foam according to the invention is characterized in that the nonionic surfactants are selected from alkyl polyglucosides (D-glucopyranose, oligomers, alkyl glucosides).

The term "alkyl-poly-glucoside" is understood to mean a nonionic surfactant having the formula: H—(C6H10O5)m-O-R1, in which (C6H10O5) is a glucose unit and R1 is a C6-C22 alkyl group, preferably C8-C16 and C8-C10, and m is a positive integer between 1 and 10, $1 \leq m \leq 10$.

In one embodiment, the alkyl polyglucosides are those marketed by the company SEPPIC, such as SIMULSOL SL8 (D-glucopyranose, oligomers, decyl octyl glycosides, 01-2119488530-36, CE: 500-200-1), or SIMULSOL SL 826 (D-glucopyranose, oligomers, decyl octyl glycosides, 01-2119488530-36, CE: 500-200-1, D-Glucopyranose, oligomeric, C10-16 (even numbered)-alkyl glycosides, 01-2119489418-23, CE: 600-975-8, (2-methoxymethylethoxy) propanol, 012119450011-60, CE: 252-104-2, dodecan-1-ol, 01-2119485976-15, EC: 203-982-0) or SIMULSOL SL26 (D-Glucopyranose, oligomeric, C10-16 (even numbered) alkyl glycosides, 01-2119489418-23, CE: 600-975-8) or mixtures thereof.

In one embodiment, the alkyl polyglucosides SIMULSOL SL 8, SL 826 and SL26 are in preferential ratios of 50:50 for the couple SL8:SL826 and 50:2.5:47.5 for that of SL8:SL26:SL826.

In one embodiment, the geopolymer foam according to the invention is characterized in that it comprises from 1% to 17% by mass of fibers with lengths of between 5 and 1500 μm relative to the total mass of said foam.

In one embodiment, the geopolymer foam according to the invention is characterized in that it comprises from 1% to 15% by mass of fibers with lengths of between 5 and 1500 µm relative to the total mass of said foam.

In one embodiment, the geopolymer foam according to the invention is characterized in that it comprises from 1% to 12% by mass of fibers with lengths of between 5 and 1500 µm relative to the total mass of said foam.

In one embodiment, the geopolymer foam according to the invention is characterized in that the fibers have lengths between 5 and 1000 µm.

In one embodiment, the geopolymer foam according to the invention is characterized in that the fibers have lengths between 10 and 800 µm.

In one embodiment, the geopolymer foam according to the invention is characterized in that the fibers have lengths between 5 and 50 µm.

In one embodiment, the geopolymer foam according to the invention is characterized in that the fibers have lengths between 10 and 40 µm.

In one embodiment, the geopolymer foam according to the invention is characterized in that the fibers have lengths between 15 and 30 µm.

In one embodiment, the geopolymer foam according to the invention is characterized in that the fibers are selected from the group consisting of plant fibers, animal fibers, mineral fibers, semi-synthetic fibers, polymeric fibers.

In one embodiment, the geopolymer foam according to the invention is characterized in that the fibers are not cellulose nanofibers (CNF).

In one embodiment, the geopolymer foam according to the invention is characterized in that the fibers do not have dimensions in the nanometer range. This is understood to mean that no fiber has an average length of less than 1 µm.

In one embodiment, the geopolymer foam according to the invention is characterized in that the fibers are cellulose fibers.

Preferably, the cellulose fibers possess at least one of the following characteristics:

They are made from paper pulp, made from wood from renewable resources.

They have an average diameter of approximately 25 µm.

They have an apparent mass between 20 and 250 g/L.

They are resistant to temperatures of up to 150° C., briefly up to approximately 200° C.

They have a high absorption and retention of liquid media.

They have a high traction resistance.

They are insoluble in water and oil and are not comparable to cellulose derivatives soluble in water such as carboxymethyl cellulose (CMC).

They are inert to acids and alkalis in a range of pH values from 4 to 12.

The use of micrometric lengths of fibers contributes significantly to increasing the density of the cells or pores, as well as the stability of the foam in its liquid phase before curing.

In one embodiment, the geopolymer foam according to the invention is characterized in that it further comprises at least one hydrophobic agent.

In one embodiment, the geopolymer foam according to the invention is characterized in that it further comprises from 1% to 20% by mass of at least one hydrophobic agent relative to the total mass of said foam.

In one embodiment, the geopolymer foam according to the invention is characterized in that it further comprises from 1% to 15% by mass of at least one hydrophobic agent relative to the total mass of said foam.

In one embodiment, the geopolymer foam according to the invention is characterized in that it further comprises from 1% to 10% by mass of at least one hydrophobic agent relative to the total mass of said foam.

In one embodiment, the geopolymer foam according to the invention is characterized in that the at least one hydrophobic agent is selected from the group consisting of siliconates, silanes, siloxanes and mixtures thereof.

In one embodiment, the geopolymer foam according to the invention is characterized in that it further comprises at least one thickener.

The term "thickener" is understood to mean a substance intended to modulate/increase the viscosity of a composition.

In one embodiment, the geopolymer foam according to the invention is characterized in that it further comprises from 1 to 25% by mass of at least one thickener relative to the total mass of said foam.

In one embodiment, the geopolymer foam according to the invention is characterized in that it further comprises from 1 to 20% by mass of at least one thickener relative to the total mass of said foam.

In one embodiment, the geopolymer foam according to the invention is characterized in that it further comprises from 1 to 15% by mass of at least one thickener relative to the total mass of said foam.

In one embodiment, the foam is characterized in that the at least one thickener is selected from the group consisting of chemically modified water-soluble starches such as pre-frozen starch, salts of carboxymethylated starches and adipates of acetylated distarch, galactomannans such as guar gum, xanthan gum, mineral fillers such as kaolinite clays, cellulose derivatives such as methyl ethyl cellulose, and mixtures thereof.

The term "kaolinite" is understood to be a hydrated alumina silicate constituting one of the main clay minerals and forming the essential element of kaolin.

In one embodiment the at least one thickener is a mineral filler.

Mineral fillers are used to improve the mechanical characteristics, the refractory properties, as well as the material price of mineral foams. Preferably the inorganic filler is kaolinite clay as it is used to produce metakaolin and it does not react under the action of the activating solution under the conditions of foam manufacturing procedures.

In one embodiment the at least one thickener is a chemically modified starch.

Preferably the chemically modified starch is a pre-frozen starch.

In one embodiment, the geopolymer foam according to the invention is characterized in that it further comprises at least one protein or a mixture of animal or plant proteins selected from the group consisting of albumin, keratin hydrolysates such as extracts of keratin from animal hooves and/or horns, and mixtures thereof.

In one embodiment, the geopolymer foam according to the invention is characterized in that it further comprises from 0.1% to 10% by mass of the at least one protein or a mixture of animal or plant proteins selected from the group consisting of albumin, keratin hydrolysates such as extracts of keratin from animal hooves and/or horns, and mixtures thereof, relative to the total mass of said foam.

In one embodiment, the geopolymer foam according to the invention is characterized in that it further comprises from 0.1% to 7% by mass of the at least one protein or a mixture of animal or plant proteins selected from the group consisting of albumin, keratin hydrolysates such as extracts of keratin from animal hooves and/or horns, and mixtures thereof, relative to the total mass of said foam.

In one embodiment, the geopolymer foam according to the invention is characterized in that it further comprises from 0.1% to 5% by mass of the at least one protein or a mixture of animal or plant proteins selected from the group consisting of albumin, keratin hydrolysates such as extracts of keratin from animal hooves and/or horns, and mixtures thereof, relative to the total mass of said foam.

Preferably the at least one protein or mixture of animal or vegetable proteins are keratin hydrolysates.

The use of keratin hydrolysates facilitates the entrainment of air during the manufacture of the foam and provides a lubricating effect which allows better flow of the foam at densities less than or equal to 200 Kg/m$^3$.

In one embodiment, the geopolymer foam according to the invention is characterized in that it further comprises at least one pH buffer.

In one embodiment, the geopolymer foam according to the invention is characterized in that it further comprises from 0.1% to 15% by mass of at least one pH buffer relative to the total mass of said foam.

In one embodiment, the geopolymer foam according to the invention is characterized in that it further comprises from 0.1% to 10% by mass of at least one pH buffer relative to the total mass of said foam.

In one embodiment, the geopolymer foam according to the invention is characterized in that it further comprises from 0.1% to 7% by mass of at least one pH buffer relative to the total mass of said foam.

In one embodiment, the geopolymer foam according to the invention is characterized in that it comprises at least one pH buffer, selected from the group consisting of monocalcium phosphate, bicalcium phosphate, citric acid, citrate, gamma butyrolactone esters, glyceryl triacetate, glycerol and mixtures thereof.

In one embodiment, the geopolymer foam according to the invention is characterized in that the at least one pH buffer is bi-calcium phosphate.

In one embodiment, the geopolymer foam according to the invention is characterized in that it further comprises at least one set-accelerator.

In one embodiment, the geopolymer foam according to the invention is characterized in that it further comprises from 0.1% to 8% by mass of at least one set-accelerator relative to the total mass of said foam.

In one embodiment, the geopolymer foam according to the invention is characterized in that it further comprises from 0.1% to 6% by mass of at least set-accelerator relative to the total mass of said foam.

In one embodiment, the geopolymer foam according to the invention is characterized in that it further comprises from 0.1% to 4% by mass of at least one set-accelerator relative to the total mass of said foam.

In one embodiment, the geopolymer foam according to the invention is characterized in that it comprises at least one set-accelerator selected from the group consisting of Portland cement, plaster of Paris, calcium hydroxide, hydrated lime, and mixtures thereof.

In one embodiment, the geopolymer foam according to the invention is characterized in that the at least one set-accelerator is hydrated lime.

The addition of a set-accelerator allows the foam produced at the exit of the machine to solidify in less than an hour to half an hour, thus freezing the distribution of gas microbubbles, i.e., cells or pores, this being a determining factor for obtaining good thermal insulation properties.

In one embodiment, the geopolymer foam according to the invention is characterized in that the thermal conductivity is between 0.025 and 0.05 W·m$^{-2}$·K.

In one embodiment, the geopolymer foam according to the invention is characterized in that its density is between 80 and 300 Kg/m$^3$.

In one embodiment, the geopolymer foam according to the invention is characterized in that its density is between 100 and 150 Kg/m$^3$.

In one embodiment, the foam according to the invention is characterized in that it has a thermal resistance greater than 900° C., preferably greater than 1000° C. and even more preferably up to at least 1200° C.

The invention also relates to any support such as for example a fire door, an insulating panel, a furnace, a pipe, which comprises or upon which is affixed an incombustible inorganic foam as defined above. The support on which is affixed a non-combustible inorganic foam as defined above can be made of any material selected from organic, inorganic or metallic materials, such as for example a wooden board, a brick or a metal beam.

The invention also relates to a process for preparing a geopolymer foam comprising the following steps:
  a) Place in contact within an aqueous solution,
    at least one pozzolanic material,
    an activation solution comprising at least one soluble metal hydroxide,
    at least one silicate,
    at least one surfactant,
    fibers with lengths of between 5 and 1500 µm.
  b) Mix by stirring and obtaining a suspension,
  c) Introduction of a gas,
  d) Hardening.

In one embodiment, the process for preparing a geopolymer foam is characterized in that the at least one soluble metal hydroxide is an alkali metal hydroxide.

Preferably, the at least one alkali metal hydroxide is selected from the group consisting of sodium hydroxide and potassium hydroxide, alone or in combination.

In one embodiment, the process for preparing a geopolymer foam is characterized in that the amount of the at least one surfactant relative to the total mass of the suspension obtained in step b) is between 0.03% and 0.6%.

In one embodiment, the process for preparing a geopolymer foam is characterized in that the amount of the at least one surfactant relative to the total mass of the suspension obtained in step b) is between 0.03% and 0.45%.

In one embodiment, the process for preparing a geopolymer foam is characterized in that the amount of the at least one surfactant relative to the total mass of the suspension obtained in step b) is between 0.03% and 0.3%.

Preferably, in one embodiment, the process for preparing a geopolymer foam is characterized in that the amount of the at least one surfactant relative to the total mass of the suspension obtained in step b) is between 0.03 and 0.15%.

In one embodiment, the process for preparing a geopolymer foam is characterized in that the amount of fibers with lengths of between 5 and 1500 µm relative to the total mass of the suspension obtained in step b) is between 1% and 10%.

In one embodiment, the process for preparing a geopolymer foam is characterized in that the amount of fibers with lengths of between 5 and 1500 µm relative to the total mass of the suspension obtained in step b) is between 1% and 8%.

In one embodiment, the process for preparing a geopolymer foam is characterized in that the amount of fibers with lengths of between 5 and 1500 µm relative to the total mass of the suspension obtained in step b) is between 2% and 7%.

In one embodiment, the process for preparing a geopolymer foam is characterized in that the amount of fibers with lengths of between 5 and 1500 µm relative to the total mass of the suspension obtained in step b) is between 3% and 6%.

In one embodiment, the process for preparing a geopolymer foam is characterized in that the fibers have lengths between 5 and 1000 µm.

In one embodiment, the process for preparing a geopolymer foam is characterized in that the fibers have lengths between 10 and 800 µm.

In one embodiment, the process for preparing a geopolymer foam is characterized in that the fibers have a diameter of between 5 and 50 µm.

In one embodiment, the process for preparing a geopolymer foam is characterized in that the fibers have a diameter of between 10 and 40 µm.

In one embodiment, the process for preparing a geopolymer foam is characterized in that the fibers have a diameter of between 15 and 30 µm.

In one embodiment, the process for preparing a geopolymer foam is characterized in that the fibers are cellulose fibers.

In one embodiment, the process for preparing a geopolymer foam is characterized in that the amount of the pozzolanic material relative to the total mass of the suspension obtained in step b) is between 20% and 60%.

In one embodiment, the process for preparing a geopolymer foam is characterized in that the amount of the pozzolanic material relative to the total mass of the suspension obtained in step b) is between 25% and 55%.

In one embodiment, the process for preparing a geopolymer foam is characterized in that the amount of the pozzolanic material relative to the total mass of the suspension obtained in step b) is between 30% and 50%.

In one embodiment, the process for preparing a geopolymer foam is characterized in that the amount of the pozzolanic material relative to the total mass of the suspension obtained in step b) is between 35% and 45%.

In one embodiment, the process for preparing a geopolymer foam is characterized in that in step a), the pozzolanic material is metakaolin.

In one embodiment, the process for preparing a geopolymer foam is characterized in that in step a) at least one hydrophobic agent is added.

In one embodiment, the process for preparing a geopolymer foam is characterized in that in step a) at least one hydrophobic agent from 2% to 10% by mass relative to the total mass of the suspension obtained in step b) is added.

In one embodiment, the process for preparing a geopolymer foam is characterized in that in step a) at least one hydrophobic agent from 2% to 8% by mass relative to the total mass of the suspension obtained in step b) is added.

In one embodiment, the process for preparing a geopolymer foam is characterized in that in step a) at least one hydrophobic agent from 2% to 6% by mass relative to the total mass of the suspension obtained in step b) is added.

In one embodiment, the process for preparing a geopolymer foam is characterized in that in step a) at least one thickener from 1% to 10% by mass relative to the total mass of the suspension obtained in step b) is added.

In one embodiment, the process for preparing a geopolymer foam is characterized in that in step a) at least one thickener is added.

In one embodiment, the process for preparing a geopolymer foam is characterized in that in step a) at least one thickener from 1% to 8% by mass relative to the total mass of the suspension obtained in step b) is added.

In one embodiment, the process for preparing a geopolymer foam is characterized in that in step a) at least one thickener from 3 to 7% by mass relative to the total mass of the suspension obtained in step b) is added.

In one embodiment, the process for preparing a geopolymer foam is characterized in that in step b) the stirring is carried out using a deflocculating disc dispenser.

The stirring speed is adapted based on the dimensions of the disc and the tank.

In one embodiment, the process for preparing a geopolymer foam is characterized in that between step b) and c) at least one protein or a mixture of animal or plant proteins selected from the group consisting of albumin, keratin hydrolysates such as extracts of keratin from animal hooves and/or horns, and mixtures thereof is added.

In one embodiment, the process for preparing a geopolymer foam is characterized in that between step b) and c) between 0.1% to 4% by mass of at least one protein or one mixture of animal or vegetable proteins selected from the group consisting of albumin, keratin hydrolysates such as extracts of keratin from animal hooves and/or horns, and mixtures thereof, relative to the total mass of the suspension obtained in step b) is added.

In one embodiment, the process for preparing a geopolymer foam is characterized in that between step b) and c) between 0.1% to 3% by mass of at least one protein or one mixture of animal or vegetable proteins selected from the group consisting of albumin, keratin hydrolysates such as extracts of keratin from animal hooves and/or horns, and mixtures thereof, relative to the total mass of the suspension obtained in step b) is added.

In one embodiment, the process for preparing a geopolymer foam is characterized in that between step b) and c) between 0.1% to 2% by mass of at least one protein or one mixture of animal or vegetable proteins selected from the group consisting of albumin, keratin hydrolysates such as extracts of keratin from animal hooves and/or horns, and mixtures thereof, relative to the total mass of the suspension obtained in step b) is added.

In one embodiment, the process for preparing a geopolymer foam is characterized in that between step b) and c) at least one set-accelerator is added.

In one embodiment, the process for preparing a geopolymer foam is characterized in that between step b) and c) at least one set-accelerator from 0.1% to 4% by mass relative to the total mass of the suspension obtained in step b) is added.

In one embodiment, the process for preparing a geopolymer foam is characterized in that between step b) and c) at least one set-accelerator from 0.1% to 3% by mass relative to the total mass of the suspension obtained in step b) is added.

In one embodiment, the process for preparing a geopolymer foam is characterized in that between step b) and c) at least one set-accelerator from 0.1% to 2% by mass relative to the total mass of the suspension obtained in step b) is added.

In one embodiment, the process for preparing a geopolymer foam is characterized in that between step b) and c) the at least one set-accelerator is hydrated lime.

The term "gas" is understood to mean any body which is in the state of an expandable and compressible fluid (gaseous state) under normal temperature and pressure conditions.

In one embodiment, the process for preparing a geopolymer foam is characterized in that in step c), the gas is air.

In one embodiment, the process for preparing a geopolymer foam is characterized in that in step c) the introduction of gas is carried out using an expansion machine.

The use of an expansion machine, also called an aerator/mixer, with a dynamic or static expansion unit, preferably dynamic, ensures control over the definition of the densities of the foam, the density and the size of the cells present in it through flow controls, which are desirable characteristics for non-combustible foams according to industrial applications.

The invention also relates to a composition for the preparation of a geopolymer foam comprising:
- an alkaline activation solution comprising at least one soluble metal hydroxide,
- at least one silicate;
- at least one surfactant,
- fibers with lengths of between 5 and 1500 μm.

In one embodiment, the composition for preparing a geopolymer foam is characterized in that the at least one soluble metal hydroxide is an alkali metal hydroxide.

Preferably, the at least one alkali metal hydroxide is selected from the group consisting of sodium hydroxide and potassium hydroxide, alone or in combination.

In one embodiment, the composition for preparing a geopolymer foam is characterized in that it comprises at least one surfactant from 0.03% to 0.6% by mass relative to the total mass of said composition.

In one embodiment, the composition for preparing a geopolymer foam is characterized in that it comprises at least one surfactant from 0.03% to 0.45% by mass relative to the total mass of said composition.

In one embodiment, the composition for preparing a geopolymer foam is characterized in that it comprises at least one surfactant from 0.03% to 0.3% by mass relative to the total mass of said composition.

In one embodiment, the composition for the preparation of a geopolymer foam is characterized in that the at least one surfactant is selected from the group consisting of nonionic alkyl polyglucoside surfactants.

In one embodiment, the composition for preparing a geopolymer foam is characterized in that it comprises fibers with lengths of between 5 and 1500 μm from 1% to 10% by mass relative to the total mass of said composition.

In one embodiment, the composition for preparing a geopolymer foam is characterized in that it comprises fibers with lengths of between 5 and 1500 μm from 1% to 8% by mass relative to the total mass of said composition.

In one embodiment, the composition for preparing a geopolymer foam is characterized in that it comprises fibers with lengths of between 5 and 1500 μm from 2% to 7% by mass relative to the total mass of said composition.

In one embodiment, the composition for preparing a geopolymer foam is characterized in that it comprises fibers with lengths of between 5 and 1500 μm from 3% to 6% by mass relative to the total mass of said composition.

In one embodiment, the composition for preparing a geopolymer foam is characterized in that the fibers have lengths between 5 and 1000 μm.

In one embodiment, the composition for preparing a geopolymer foam is characterized in that the fibers have lengths between 10 and 800 μm.

In one embodiment, the composition for preparing a geopolymer foam is characterized in that the fibers have a diameter of between 5 and 50 μm.

In one embodiment, the composition for preparing a geopolymer foam is characterized in that the fibers have a diameter of between 10 and 40 μm.

In one embodiment, the composition for preparing a geopolymer foam is characterized in that the fibers have a diameter of between 15 and 30 μm.

In one embodiment, the composition for preparing a geopolymer foam is characterized in that the fibers are cellulose fibers.

In one embodiment, the composition for preparing a geopolymer foam is characterized in that it further comprises at least one hydrophobic agent.

In one embodiment, the composition for preparing a geopolymer foam is characterized in that it further comprises at least one hydrophobic agent from 2% to 10% by mass relative to the total mass of said composition.

In one embodiment, the composition for preparing a geopolymer foam is characterized in that it comprises at least one hydrophobic agent from 2% to 8% by mass relative to the total mass of said composition.

In one embodiment, the composition for preparing a geopolymer foam is characterized in that it further comprises at least one hydrophobic agent from 2% to 6% by mass relative to the total mass of said composition.

In one embodiment, the geopolymer foam according to the invention is characterized in that the at least one hydrophobic agent is selected from the group consisting of siliconates, silanes, siloxanes and mixtures thereof.

The invention also relates to the use of a composition for the preparation of a geopolymer foam as described above.

The invention also relates to a kit comprising:
- a composition for the preparation of a geopolymer foam as described above;
- a pozzolanic material.

In one embodiment, the kit according to the invention is characterized in that the pozzolanic material is metakaolin. The different elements of the kit are not in contact with each other for an extemporaneous preparation of geopolymer mineral foam.

EXAMPLES

Example 1: Composition for the Preparation of a Geopolymer Foam According to the Invention

TABLE 1

Composition for the preparation of a geopolymer foam according to the invention with a 100% basic Na activating solution.

|  |  | Components | % of dry materials |
|---|---|---|---|
| Pozzolanic Material | 1 | Metakaolin | 26.05 |
| Activation Solution | 2A | Sodium Hydroxide | 4.66 |
|  | 2B | Sodium Silicate | 10.98 |
| Other Components | 3 | Hydrophobic Agent Potassium Methyl Silicone | 4.02 |
|  | 4 | Nonionic Surfactant Alkyl Polyglucoside SFT SL8 | 0.034 |
|  | 5 | Nonionic Surfactant Alkyl Polyglucoside SL826 | 0.034 |
|  | 6 | Powdered Egg Albumin Fraction | 0.74 |
|  | 7 | Kaolinitic Clays | 5.21 |

TABLE 1-continued

Composition for the preparation of a geopolymer foam according to the invention with a 100% basic Na activating solution.

| | Components | % of dry materials |
|---|---|---|
| 8 | pH Buffer CaHPO4 | 2.61 |
| 9 | Cellulose fibers of a length of 18 or 40 μm TECHNOCEL ® 10 or 40 | 1.49 |
| 10 | Cellulose fibers of a length of 150 μm TECHNOCEL ® 90-2 | 1.49 |
| 11 | Cellulose fibers of a length of 500 and 700 μm TECHNOCEL ® 300 and 1000 | 0.74 |
| 12 | Keratin Hydrolysate | 1.19 |
| 13 | Hydrated Lime Ca(OH)2 | 1.12 |
| | Total Water | 39.63% |

Example 2: Composition for the Preparation of a Geopolymer Foam According to the Invention

TABLE 2

Composition for the preparation of a geopolymer foam according to the invention with a K based basic activating solution.

| | | Components | % of dry materials |
|---|---|---|---|
| Pozzolanic Material | 1 | Metakaolin | 25.69 |
| Activation Solution | 2A | Potassium Hydroxide | 6.17 |
| | 2B | Sodium Silicate | 4.46 |
| | 2C | Potassium Silicate | 6.31 |
| Other Components | 3 | Hydrophobic Agent Potassium Methyl Silicone | 4.08 |
| | 4 | Nonionic Surfactant Alkyl Polyglucoside SFT SL8 | 0.034 |
| | 5 | Nonionic Surfactant Alkyl Polyglucoside SL826 | 0.034 |
| | 6 | Powdered Egg Albumin Fraction | 0.76 |
| | 7 | Kaolinitic Clays | 6.04 |
| | 8 | pH Buffer CaHPO4 | 1.13 |
| | 9 | Cellulose fibers of a length of 18 or 40 μm TECHNOCEL ® 10 or 40 | 1.51 |
| | 10 | Cellulose fibers of a length of 150 μm TECHNOCEL ® 90-2 | 1.51 |
| | 11 | Cellulose fibers of a length of 500 and 700 μm TECHNOCEL ® 300 and 1000 | 0.76 |
| | 12 | Keratin hydrolysate | 1.21 |
| | 13 | Hydrated Lime Ca(OH)2 | 1.13 |
| | | Total Water | 39.17% |

Example 3: Manufacture of a Geopolymer Foam According to the Invention

Manufacturing the Cream:

Liquid components (2A, 2B, 2C, 3, 4, 5) are mixed, solid components (1, 6, 7) and fibers (9, 10, 11) are added and stirred with a deflocculating disc dispenser at 1000-1500 rpm for approximately 25 minutes. The temperature of the mixture is maintained at 18-20° C.

Manufacturing the Foam:

The component 8 is added and mixed for 1 min under the same conditions, then components 12, 13, as well as water QSP are mixed for one minute. The cream may then be aerated using an expansion machine. The air and cream flow rates and the speed of the expansion unit are adjusted to obtain the final foam upon leaving the machine.

Example 4: Comparative Test Between a Geopolymer Foam According to the Invention with and without Fibers, as Well as with a Geopolymer Foam Disclosed in WO2018091482

A simplified geopolymer foam composition was carried out to demonstrate the effect of the presence or absence of micrometric sized fibers on the texture of the geopolymer foam.

The composition of the 3 samples tested is summarized in the following Table 3:

TABLE 3 composition of samples tested.

| Components | % of dry materials |
|---|---|
| Metakaolin | 26.72 |
| K based activating solution | 17.61 |
| Hydrophobic Agent | 4.25 |
| Surfactants | 0.07 |
| Total Water | 51.35% |

Three portions of the above composition weighing 200 g or 230 ml are poured into 3 separate 1 L beakers.

No addition is made to a first beaker A.

In a second beaker B, 4.33% by mass of fibers having a length of 18 μm relative to the total mass of the composition is added. 99.5% of these fibers are less than 32 μm in length.

In a third beaker C, 4.33% of millimetric fibers is added. In particular, these millimetric fibers are used as fillers in the composition of the geopolymer foam disclosed in WO2018091482. 80% of the millimetric fibers added have a length of between 800 μm and 2.5 mm.

The various fibers added to beakers B and C are mixed by stirring for 3 minutes and then the mixture is left to stand for 10 minutes before being stirred again for one minute at low speed.

The foams are then produced using a kitchen mixer with 5 speeds, in the following sequence:

30 seconds at speed 1 (the lowest speed);
2 minutes and 30 seconds at speed 4.

The same operating mode is applied to the 3 mixtures, A, B and C.

The 3 samples are then left to stand for solidification.

Results:

At T=2 hours, a change in surface appearance is observed in sample A as well as in sample C. No change is observed in sample B.

At T=5 hours, the samples are completely solidified. A marked and clear porosity is observed in samples A and C, while sample B has a homogeneous appearance with fine porosity.

The appearance of the 3 different samples is illustrated in FIG. 1.

These observations demonstrate that the use of fibers of micrometric sizes in a geopolymer foam composition confers upon it the nature of a closed cell or pore after solidification.

Example 5: Comparative Test Between a Foam According to the Invention and a Foam Disclosed in WO2018091482

One sample of each foam is available in the form of cylindrical stoppers of approximately 800 ml. The samples have similar densities (approximately 250 Kg/m$^3$).

Each of the 2 samples was placed in a large container filled with water. Each container are sized to allow free movement of the sample and its complete immersion. The samples are placed on water and left for 5 min. The immersion height of each sample in water is measured and expressed as a percentage of the total height of the latter.

The samples are then removed from the water and placed on an inclined plane so as to drain out the water trapped in their porosities for a period of 2 hours.

The samples are weighed before testing and after draining, the increase in weight as compared to the initial weight is expressed as a percentage.

Case of the Foam Sample Disclosed in WO2018091482:
Immersion height after 5 min.=75 to 80%, the sample gradually sinks.
Weight increase after draining=81%
Case of the Foam Sample According to the Invention
Immersion height after 5 min=10-15%, the immersion depth remains unchanged, the sample floats.
Weight increase after draining=0.9%

These observations demonstrate that the foam according to the invention has a majority of closed cells unlike the foam disclosed in WO2018091482, the porosity of which is open.

The invention claimed is:

1. A geopolymer foam comprising:
   from 50% to 90% by mass of pozzolanic material polymerized relative to a total mass of said foam;
   from 0.01% to 2%, by mass of at least one surfactant relative to the total mass of said foam;
   from 1% to 20% by mass of cellulose fibers with lengths of between 10 and 800 μm relative to the total mass of said foam; and
   cells, a majority of which are closed cells.

2. The geopolymer foam according to claim 1 characterized in that the pozzolanic material is metakaolin.

3. The geopolymer foam of claim 1, comprising a thermal conductivity between 0.025 W·m−2·K and 0.05 W·m−2·K.

4. A process for the preparation of a geopolymer foam comprising the following steps:
   a) placing into contact within an aqueous solution,
      at least one pozzolanic material,
      an activation solution comprising at least one soluble metal hydroxide,
      at least one silicate,
      at least one surfactant, and
      cellulose fibers with lengths of between 10 and 800 μm;
   b) mixing by stirring and obtaining a suspension to form a mixture;
   c) introducing a gas into the mixture;
   d) hardening the mixture,
   e) obtaining a geopolymer foam according to claim 1.

5. The process for the preparation of a geopolymer foam according to claim 4 characterized in that the amount of the at least one surfactant relative to the total mass of the suspension obtained in step b) is between 0.03% and 0.6%.

6. The process for the preparation of a geopolymer foam according to claim 4, characterized in that the amount of fibers with lengths of between 5 and 1500 μm relative to the total mass of the suspension obtained in step b) is between 1% and 10%.

7. The process for the preparation of a geopolymer foam according to claim 5, characterized in that the amount of fibers with lengths of between 5 and 1500 μm relative to the total mass of the suspension obtained in step b) is between 1% and 10%.

8. A geopolymer foam comprising:
   from 50% to 90% by mass of pozzolanic material polymerized relative to a total mass of said foam;
   from 0.01% to 2%, by mass of at least one surfactant relative to the total mass of said foam;
   from 1% to 20% by mass of fibers with lengths of between 10 μm and 800 μm relative to the total mass of said foam;
   no fibers less than 1 μm in length;
   cells, a majority of which are closed cells; and
   a thermal conductivity between 0.025 W·m−2·K and 0.05 W·m−2·K.

* * * * *